Patented Dec. 20, 1949

2,491,495

UNITED STATES PATENT OFFICE 2,491,495

PROCESS OF STABILIZING CAROTENE

Edwin B. Hart and Andrew W. Halverson, Madison, Wis., assignors to Wisconsin Alumni Research Foundation, Madison, Wis., a corporation of Wisconsin No Drawing. Application November 8, 1948, Serial No. 59,018

23 Claims. (Cl. 99—171)

1

Our invention relates to the stabilization of carotene in dehydrated carotene-containing plant material used for feeds and foods, especially alfalfa and clover and cereal grasses, during storage; whether that plant material is stored alone or mixed with other material, as for instance in the so-called mixed feeds.

The present application is a continuation in part of our co-pending application Serial No. 740,264, filed April 8, 1947; which application, but not the invention it disclosed, has been abandoned in favor of this present application.

The problem of stabilizing carotene during storage of plant material containing it has been studied for many years, with varying degrees of partial success in solving it. It is a very important problem, for the value and the price of many plant materials used for feeds and foods often depend on the carotene content of those plant materials, and decrease markedly as that carotene content falls. This is especially true of ground and dehydrated plant materials, for the problem then increases in difficulty. When it is realized that about a million tons of dehydrated ground alfalfa, for instance, are sold each year, it is apparent that even a seemingly small loss in carotene content and therefore in value and in price involves an aggregate loss that is tremendous.

Among the solutions which have been offered for this problem, for decreasing carotene loss in dehydrated plant material during storage, are treatment with various chemical agents, particularly with reducing agents or acceptors of oxygen; pelleting or briquetting, by itself or associated with an air-excluding coating, such for instance as wax; washing with nitrogen or carbon dioxide or other inert gas; autoclaving; and various combinations of these things. These attempted solutions of the problem, as already noted, have had various degrees of partial success, but usually they have involved costs which are not justified by that partial effectiveness.

In the processing of various carotene-containing plant materials used for feeds and foods, such as alfalfa and clover and cereal grasses, it has ordinarily been considered desirable to dry the plant materials to a fairly low moisture content; especially if they are to be ground, for the dryness facilitates that grinding. Quite commonly that drying has been to a moisture content of between 2% and 5%. But plant material so dried is very unstable in its carotene content, and loss of carotene occurs relatively rapidly under ordinary storage conditions. We have found that that

2 loss is very rapid if air is not excluded; and that it also occurs even if air is excluded if the moisture content is below about 10% or 12%, although fairly slowly when the moisture content is above about 7%. This loss of carotene content occurs at moisture contents below about 10% or 12%, with little or no apparent slackening, even if the carotene-destroying "lipoxidase" present has itself been largely or completely destroyed, as by autoclaving. If ingress of oxygen is permitted, we have found that the loss of carotene occurs regardless of the extent of dehydration; so that, with ingress of oxygen, marked loss in carotene content occurs with any moisture content.

We have discovered that we can obtain a very effective stabilization of carotene in dehydrated carotene-containing plant material, such as dehydrated alfalfa and dehydrated clover and dehydrated cereal grasses (oats or rye for instance), by converting into carbon dioxide oxygen in contact with such plant material, and preventing ingress of additional oxygen to said plant material. The conversion into carbon dioxide of oxygen in contact with such plant material is done by respiratory enzymes present in that plant material or in other plant material in contact with it (as in so-called mixed feeds), or by enzymes in both plant materials. These things may be done by combining two simple things during storage: first, by having the moisture content of the dehydrated plant material between 7% and 20%; and, second, by storing the dehydrated plant material in containers which substantially prevent ingress of oxygen during the storage. Further, we can do this at a cost that is low in comparison with the effectiveness of carotene stabilization obtained.

By preventing ingress of oxygen and having suitable moisture present there occurs during storage a using up of the oxygen of any initially present air, with the formation of carbon dioxide; due to the action of respiratory enzymes present in the plant material. As a result of this conversion of oxygen into carbon dioxide, the particles of the plant material in the containers are no longer in contact with oxygen, but with the inert carbon dioxide that is formed. This inert carbon dioxide prevents oxidation that is the cause of the destruction of carotene. That this is so is shown by the fact that after a few days' storage the gases in the container are found by analysis to be rich in carbon dioxide.

The mere prevention of ingress of oxygen does not in itself adequately produce this preservation of carotene, for the conversion into carbon dioxide of residual oxygen in the containers is also essential. This conversion is by the respiratory enzymes, and for effectiveness of action they require the presence of moisture in the desired range of 7% to 20%—of 12% to 20% if practically complete carotene preservation is desired. At moisture contents between 7% and 12% there may be some loss of carotene even when ingress of oxygen is prevented, in increasing amounts as the value of the moisture content decreases; although even then the loss of carotene is small in comparison with that which occurs when ingress of oxygen is not prevented, and is in many cases acceptably small so long as the moisture content does not fall below 7%.

As already noted, the using up of residual oxygen in the containers by converting it into carbon dioxide is due to the action of respiratory enzymes present. These respiratory enzymes are present in the carotene-containing plant material; and also may be present in co-present plant material, as in the so-called mixed feeds. These respiratory enzymes are less active at the low moisture contents below about 7%, are somewhat active at moisture contents between 7% and 12%, and are quite active at moisture contents between 12% and 20%; and are reactivated if plant material dried below 7% has water added to raise the moisture content to between 7% and 20%. The action of these respiratory enzymes plays a large part and we believe a controlling part in the production of carbon dioxide by the plant material, and their effectiveness depends upon the moisture content. The storage temperature should not exceed the temperature which inactivates these respiratory enzymes; and for practical purposes we are careful that the storage temperature does not exceed about 40° C. Desirably we have a storage temperature of the order of 20° to 40° C.

If the adjustment of the moisture content is between 12% and 20%, we can ordinarily get substantially complete preservation of the carotene; but in the storage of dehydrated alfalfa or cereal grasses, as distinguished from mixed feeds, that is sometimes accompanied, especially in the higher part of that range of moisture content (above about 15%), by an undesirable change in color from the wanted natural green to an olive green or even a greenish brown. On the other hand, if the adjustment of the moisture content is between about 7% and 15%, there is a good preservation of the wanted natural green color. With moisture contents below about 12%, however, there may be some loss of carotene, a loss which increases in amount as the value of the moisture content during storage is farther below 12%; but this loss of carotene is comparatively small so long as the moisture content is maintained above about 7%, and is sufficiently small in comparison with the desirability of preserving the green color that often it may be disregarded and is acceptable.

So our invention in its broader aspects contemplates a moisture content anywhere in the range between 7% and 20%, provided the storage is in containers which substantially prevent the ingress of oxygen. We prefer a moisture content between 12% and 20% if color is immaterial and substantially complete carotene stabilization is desired, and prefer a moisture content between 8% and 12% when the natural green color is desired even at the expense of some possible loss of carotene.

Thus we have discovered the surprising fact that if we provide in the dehydrated plant material a moisture content of between 12% and 20%, and substantially prevent ingress of oxygen to the storage containers during storage, the loss of carotene during storage is reduced to negligible proportions; indeed, the reduction in that loss is so great that in many instances there has been no ascertainable loss whatsoever in carotene content on three months' storage. The proper moisture content of between 12% and 20%, and the prevention of ingress of oxygen, are both necessary for this substantially complete carotene preservation. With absolutely no ascertainable loss in three months, there is no reason to expect a loss over longer periods of storage under these conditions. And we have also discovered the further surprising fact that the carotene loss is sufficiently small with moisture contents down as low as 7%, provided we substantially prevent ingress of oxygen during the storage, that it is acceptable; and that with the moisture contents between 8% and 12% there is substantially no change from the wanted natural green color of dehydrated alfalfa or cereal grasses under these storage conditions.

The obtaining of the desired percentage of moisture, of between 7% and 20%, may be done in various ways. It may be done by simply carrying the dehydration to that moisture percentage, and then stopping the dehydration. But if the plant material is to be ground, the higher part of that range is often too high for effective grinding, because clogging occurs in the grinding; so that for facility in grinding it is usually desirable to reduce the moisture content to well below 10%, conveniently to about 2% to 5%, as then the grinding is ordinarily more effective, and clogging is less likely to cause trouble. So if the plant material after grinding has less than the desired moisture, and it is desired that the moisture content during storage be higher, our adjustment of the moisture content is by adding moisture rather than by removing it; and this is usually our preferred procedure for obtaining the desired higher moisture content.

In order to prevent the ingress of oxygen, which is a co-essential with the proper moisture content during storage, the ground plant material having the proper moisture content is put in containers of any suitable character which will substantially prevent ingress of oxygen. These containers, for instance, may be large bins to which ingress of oxygen is substantially prevented in any desired manner; or they may be cardboard cartons, or even paper or fabric sacks, to which ingress of oxygen is substantially prevented by coating them with a suitable wax, such as the so-called "flexo" wax—a wax which remains fairly flexible at ordinary temperatures, so that it does not readily crack. When such a coating is used it need have no particular thickness, for any thickness that will keep out oxygen is sufficient. The coating may be done by dipping or by pouring, or even by spraying. If the containers are small, the dipping process is often most convenient; but for large containers, or for bins if they are coated, the coating with wax or other sealing against substantial ingress of oxygen is ordinarily done by pouring or spraying. The containers we prefer are bags or sacks having an inner liner of plastic material which is substantially impervious to oxygen; and we have found that one excellent film plastic for this is saran, and especially saran film 517, which is a polyvinylidene chloride film. These plastic-material liners can have their seams and their mouths suitably sealed, by any method which prevents substantial ingress of oxygen; as by heat sealing, electronic welding, or in any other desired manner. If the containers are of material which is inherently impervious to oxygen, as saran film 517 substantially is, then the wax (if wax is used) or heat sealing or electronic welding or other closing means need be used only where there are joints or openings which would otherwise admit oxygen. Metal containers, such as steel or tin drums, and glass containers, if properly sealed at the joints and openings, are also suitable.

The following are examples of our process:

EXAMPLE 1

Commercial ground and dehydrated oat material (oat grass) initially containing about 7% moisture was mixed with enough additional water to provide a moisture content of 20%. This was then placed in tubular cellophane containers, and lightly pressed; and the ends of the cellophane containers were twisted and tied with a string and the whole containers then dipped in melted flexo wax to make them substantially oxygen-impervious. On storage of this oat material in these sealed containers for three months at 22-25° C., no detectable loss of carotene content occurred, but a darkening in color toward a brown occurred.

This example was conducted with several controls:

In one control the oat material containing 20% moisture was put into the cellophane containers as before, but the containers were not dipped in wax to seal them to make them oxygen-impervious. Here a loss of 49.7% in carotene content occurred on three months' storage at 22-25° C.

In a second control the oat material containing 20% moisture was dried at 95° C. for about forty minutes, to drive off the added water and leave only about 7.5%, and then put into the cellophane containers, and those containers then sealed by dipping in wax to make them oxygen-impervious. In spite of this sealing, a loss of 26% occurred in carotene content on three months' storage at 22-25° C. This loss was only about half that which occurred at the higher 20% moisture content when there was no sealing; so that sealing with a moisture content as low as about 7.5% gave partial but incomplete protection against carotene loss.

Thus both sufficient moisture content, at least about 12%, and sealing against substantial ingress of oxygen, were necessary for full prevention of loss of carotene.

EXAMPLE 2

Commercial ground dehydrated oat material (oat grass) initially containing about 10% of water was placed in round cardboard boxes about 3.5 inches in diameter and 4 inches deep, after being mixed with different amounts of water to give a series of moisture contents. Some of the containers were filled to the brim, with no free air space; but some others were filled only to about 3.5 inches deep, so that there was a half-inch air-space at the top. Close fitting covers were put on all these containers, and the containers were sealed and made substantially oxygen-impervious by being dipped in and completely coated with flexo wax; with some control containers unsealed, so that they were not made oxygen-impervious. The following table shows the results on storage at 22-25° C. for three months.

| Total Water, Percent | Waxed | Carotene Loss, Percent | Color Change |
|---|---|---|---|
| 10 | No | 26.6 | None. |
| 10 | Yes | 21.6 | Do. |
| 15 | Yes | 0.0 | Slightly darker. |
| 20 | Yes | 0.0 | Much darker. |
| 20—½″ airhead | Yes | 0.0 | Do. |

The first sample was not stored under the conditions required by our invention, and the carotene loss was the highest. The third sample was stored under preferred conditions of our invention, and there was no detectable carotene loss and little change in color. The second, fourth, and fifth samples were stored under the broad conditions of our invention, but not under preferred conditions; and there was some carotene loss in sample 2 (but less than in sample 1) with no color change, and no detectable carotene loss in samples 4 and 5 but very considerable color change whether or not the half-inch air-head was present.

EXAMPLE 3

Commercial ground dehydrated alfalfa initially containing about 7.2% of water was placed in cardboard containers like those used in Example 2, after being mixed with varying amounts of water to give a series of moisture contents. As in Example 2, some of the containers were filled to the brim, while in others a half-inch air-head was left. Close fitting covers were put on the containers, and the containers were sealed and made substantially oxygen-impervious by being dipped in and completely coated with flexo wax; with some control containers unsealed, so that they wer not made oxygen-impervious. The following table shows the results on storage at 22-25° C. for three months.

| Total Water, percent | Waxed | Carotene Loss, percent | Color Change |
|---|---|---|---|
| 7.2 | No | 32.0 | None. |
| 7.2 | Yes | 10.7 | Do. |
| 12.2 | Yes | 3.7 | Very slightly darker. |
| 17.2 | Yes | 0.0 | Darker. |
| 20.0 | Yes | 0.0 | Much darker. |
| 20.0—½″ airhead | Yes | 0.0 | Do. |

The first sample was not stored under the conditions required by our invention, and the carotene loss was the highest. The third sample was stored under preferred conditions of our invention, and there was only barely detectable loss in carotene content and substantially no color change. The second, fourth, fifth, and sixth samples were stored under the broad conditions of our invention, but not under preferred conditions; and there was definite carotene loss in sample 2 (but much less than in sample 1) with no color change, and no detectable carotene loss in samples 4, 5, and 6 but very considerable color change whether or not the half-inch air-head was present.

EXAMPLE 4

Commercial ground dehydrated rye material (rye grass) initially containing about 7.3% of water was placed in cardboard containers like those of Examples 2 and 3, after being mixed with water in some instances; and close fitting covers were put on the containers and the containers were sealed and made oxygen-impervious by dipping in flexo wax as in Examples 2 and 3. The following table shows the results on storage at 22–25° C. for three months.

| Total Water, Percent | Waxed | Carotene Loss, Percent | Color Change |
|---|---|---|---|
| 7.3 | Yes | 19.0 | None. |
| 17.3 | Yes | 0.0 | Golden green. |

Neither sample was stored under preferred conditions required by our invention, but both under its broad conditions. The first sample, with 7.3% moisture content (at the low end of the broadly permissible range), showed no color change but some (although commonly acceptable) loss in carotene. The second sample, with 17.3% moisture content (near the high end of the broadly permissible range) showed no loss in carotene but considerable color change.

EXAMPLE 5

Four different dehydrated plant materials were subjected to tests, with moisture-content levels ranging from 0.9% to 15% in graded increments generally of 2.5%, after storage for three months at 22–25° C. in some cases and at 33–36° C. in others. These four materials were:

1. A dehydrated commercial alfalfa, having an initial carotene content of approximately 350 μg. per gram and an initial water content of 3.6%.
2. A local alfalfa, harvested under our direction near Madison, Wisconsin, dried at 50° C., first for two days in the open and then for 24 hours in a vacuum oven. This consisted of both stem and leaf, and had an initial carotene content of approximately 150 μg. per gram and an initial water content of 6.9%.
3. A dehydrated alfalfa, dried for 2.5 hours at 95° C., and after such drying having an initial carotene content of approximately 154 μg. per gram and a moisture-content of 4.4%.
4. A dehydrated cereal grass (mixed cereal), having an initial carotene content of 160 μg. per gram and an initial moisture content of 4.4%.

A number of samples of each of these materials were adjusted to different moisture contents, by adding water or by further drying as required, and placed in close-covered cardboard cartons holding approximately 250 grams. Most of the cartons were sealed and made oxygen-impervious by being dipped in flexo wax; but always with some control cartons unsealed and so not oxygen-impervious. One set of the cartons was stored for three months at 22–25° C., and a duplicate set was stored for three months at 33–35° C. Then the contents of the various cartons were sampled and observations made for carotene loss (on water-free basis), color, and aroma. In all the cases the aroma was pleasant. The other results are shown in the following tables:

*Plant material No. 1.—Dehydrated commercial alfalfa stored at 22–25° C.*

| Total Water, Per cent | Waxed | Carotene Loss, Per cent | Color |
|---|---|---|---|
| 5.2 | No | 67.0 | Green. |
| 0.9 | Yes | 34.0 | Do. |
| 2.5 | Yes | 26.0 | Do. |
| 5.0 | Yes | 5.3 | Do. |
| 7.5 | Yes | 3.6 | Do. |
| 10.0 | Yes | 0.0 | Do. |
| 12.5 | Yes | 0.0 | Slightly Olive Green. |
| 15.0 | Yes | 0.0 | Olive Green. |

*Plant Material No. 1.—Dehydrated commercial alfalfa stored at 33–36° C.*

| Total Water, Per Cent | Waxed | Carotene Loss, Per Cent | Color |
|---|---|---|---|
| 3.6 | No | 81.5 | Green. |
| 0.9 | Yes | 32.0 | Do. |
| 2.5 | Yes | 23.0 | Do. |
| 5.0 | Yes | 8.0 | Do. |
| 7.5 | Yes | 2.5 | Do. |
| 10.0 | Yes | 2.0 | Olive Green. |
| 12.5 | Yes | 0.0 | Brown. |
| 15.0 | Yes | 0.0 | Do. |

*Plant material No. 2.—Local alfalfa stored at 22–25° C.*

| Total Water, Per Cent | Waxed | Carotene Loss, Per Cent | Color |
|---|---|---|---|
| 6.9 | No | 25.6 | Green. |
| 3.4 | Yes | 18.2 | Do. |
| 5.0 | Yes | 13.7 | Do. |
| 7.5 | Yes | 8.4 | Do. |
| 10.0 | Yes | 7.0 | Do. |
| 12.0 | Yes | 0.0 | Slightly Olive Green. |
| 15.0 | Yes | 1.2 | Olive Green. |

*Plant material No. 2.—Local alfalfa stored at 33–36° C.*

| Total Water, Per Cent | Waxed | Carotene Loss, Per Cent | Color |
|---|---|---|---|
| 5.2 | No | 57.0 | Green. |
| 3.4 | Yes | 27.0 | Do. |
| 5.0 | Yes | 24.0 | Do. |
| 7.5 | Yes | 17.0 | Do. |
| 10.0 | Yes | 11.0 | Slightly Olive Green. |
| 12.5 | Yes | 11.0 | Do. |
| 15.0 | Yes | 11.0 | Olive Green. |

*Plant material No. 3.—Dehydrated alfalfa from cerophyl labs. stored at 22–25° C.*

| Total Water, Per Cent | Waxed | Carotene Loss, Per Cent | Color |
|---|---|---|---|
| 4.4 | No | 38.0 | Green. |
| 3.7 | Yes | 28.0 | Do. |
| 5.0 | Yes | 24.0 | Do. |
| 7.5 | Yes | 10.4 | Do. |
| 10.0 | Yes | 9.7 | Do. |
| 12.5 | Yes | 3.2 | Slightly Olive Green. |
| 15.0 | Yes | 0.0 | Do. |

*Plant material No. 3—Dehydrated alfalfa from cerophyl labs. stored at 33–36° C.*

| Total Water, percent | Waxed | Carotene Loss, percent | Color |
|---|---|---|---|
| 3.1 | No | 55.0 | Green. |
| 3.7 | Yes | 32.0 | Do. |
| 5.0 | Yes | 24.0 | Do. |
| 7.5 | Yes | 14.0 | Do. |
| 10.0 | Yes | 6.5 | Slightly Olive Green. |
| 12.5 | Yes | 0.0 | Olive Green. |
| 15.0 | Yes | 0.0 | Do. |

*Plant material No. 4—Dehydrated cereal grass (mixed cereal) stored at 22–25° C.*

| Total Water, percent | Waxed | Carotene Loss, percent | Color |
|---|---|---|---|
| 4.4 | No | 34.0 | Green. |
| 1.6 | Yes | 31.0 | Do. |
| 2.5 | Yes | 26.0 | Do. |
| 5.0 | Yes | 20.0 | Do. |
| 7.5 | Yes | 12.0 | Do. |
| 10.0 | Yes | 6.3 | Do. |
| 12.5 | Yes | 3.0 | Faintly Olive Green. |
| 15.0 | Yes | 0.0 | Olive Green. |

*Plant material No. 4—Dehydrated cereal grass (mixed cereal) stored at 33–36° C.*

| Total Water, percent | Waxed | Carotene Loss, percent | Color |
|---|---|---|---|
| 3.0 | No | 55.0 | Green. |
| 1.6 | Yes | 37.0 | Do. |
| 2.5 | Yes | 33.0 | Do. |
| 5.0 | Yes | 18.0 | Do. |
| 7.5 | Yes | 9.7 | Faintly Olive Green. |
| 10.0 | Yes | 1.2 | Olive Green. |
| 12.5 | Yes | 1.2 | Do. |
| 15.0 | Yes | 0.0 | Brown. |

EXAMPLE 6

The preceding Examples 1 to 5 all started with commercial ground and dehydrated plant material, as purchasable on the open market, and our invention is well adapted to such commercial plant material. But our invention is not limited to this commercial plant material, already ground and dehydrated; and we may start with other plant material, such for instance as plant material just harvested. In that case the adjustment of moisture content may be by drying to the desired percentage, instead of by adding water; accompanied by grinding if that is desired.

EXAMPLE 7

In all the preceding Examples 1 to 6, the storage in each case was of a single carotene-containing plant material, unmixed with anything else except water. But our invention is also applicable to the preservation of carotene during storage of carotene-containing plant materials mixed with other things; such, for example, as the mixed feeds, so widely used in dairy, poultry, and hog rations. An example of such a mixed feed is the following:

| | Per cent |
|---|---|
| Soybean meal | 20 |
| Wheat middlings | 20 |
| Wheat bran | 10 |
| White corn | 21 |
| Oats | 10 |
| Alfalfa meal | 15 |
| $CaCO_3$ | 2 |
| $Ca_3(PO_4)_2$ | 1 |
| Iodized salt | 1 |
| | 100 |

Frequently certain trace elements are also added, for instance as follows:

| | Per cent |
|---|---|
| $FeCl_2 + 4H_2O$ | 0.02 |
| $CuSO_4 + 5H_2O$ | 0.02 |
| $MnSO_4 + H_2O$ | 0.25 |
| $CoCl_2 + 6HO$ | 0.02 |

The only major source of carotene in this feed, with or without the trace elements, is the alfalfa meal; and the initial carotene content was 39.6 µg. per gram.

This feed, both with and without the trace elements, was stored for three months at moisture contents ranging from 2.3% to 15.0%, under sealed and unsealed conditions. The moisture in the mixed feed without the trace elements was initially reduced by drying for 2½ hours at 95° C., and that in the mixed feed with the trace elements was initially reduced by drying for 32 hours at 50° C. in a vacuum oven; and then water was added in both series to get the desired moisture contents. The storage was in closed cardboard cartons, and the sealing was by dipping in flexo wax, as in previous examples. The data obtained are shown in the following tables:

*Mixed feed containing 15% alfalfa without trace elements stored at 33–36° C.*

| Total Water, percent | Waxed | Carotene Loss, percent | Color |
|---|---|---|---|
| 3.6 | No | 93.2 | Bleached. |
| 2.5 | Yes | 65.4 | Green. |
| 5.0 | Yes | 58.1 | Do. |
| 7.5 | Yes | 13.1 | Do. |
| 10.0 | Yes | 0.0 | Do. |
| 12.5 | Yes | 0.0 | Do. |
| 15.0 | Yes | 0.0 | Slightly Olive Green. |

*Mixed feed containing 15% alfalfa with trace elements Fe, Cu, Mn, Co, stored at 33–36° C.*

| Total Water, percent | Waxed | Carotene Loss, percent | Color |
|---|---|---|---|
| 4.3 | No | 97.3 | Bleached. |
| 3.2 | Yes | 90.5 | Green. |
| 5.0 | Yes | 82.5 | Do. |
| 7.5 | Yes | 31.8 | Do. |
| 10.0 | Yes | 0.0 | Do. |
| 12.5 | Yes | 0.0 | Do. |
| 15.0 | Yes | 0.0 | Slightly Olive Green. |

It is striking that in each of these two series the non-waxed sample was bleached during the storage. In addition, in the second series (containing the trace elements) rancidity developed in the non-waxed sample. Neither bleaching nor rancidity occurred in any of the waxed samples, stored with ingress of oxygen prevented. In both series a very slight color change developed when 15% water was present.

Although in such mixed feeds, with or without the trace elements, the carotene present is substantially all in the alfalfa, the other plant materials as well as the alfalfa have respiratory enzymes, which in their respiration use up oxygen and produce carbon dioxide when there is a proper moisture content. Thus these other plant materials supplement the alfalfa in providing in the sealed containers the atmosphere rich in carbon dioxide and poor in oxygen needed for the stabilization of the carotene in our process.

So our process is effective in the stabilization of carotene in foods and feeds containing other plant materials, and if desired containing added inorganic substances such as calcium, phosphorus, iodine, iron, copper, manganese, and cobalt, as well as in foods and feeds which consist only of carotene-containing plant materials.

EXAMPLE 8

In the preceding examples the storage was in cardboard cartons, waxed and unwaxed. But for quantity storage in carrying out our invention it is usually preferable to use containers of other materials than waxed cardboard in order to prevent ingress of oxygen and to retain carbon dioxide. The container material we now prefer to prevent ingress of oxygen is plastic-film, and especially the thermoplastic polyvinylidene-chloride film called saran film—a very tough and tear-resistant vinylidene chloride copolymer made in films of various thicknesses.

Foot-long tubes of 200-gauge saran film (thickness about 0.00200 inch since the gauge number indicates hundred-thousandths of an inch) were prepared, filled with dehydrated alfalfa of various moisture contents (7.5%, 10.0%, 12.5%), sealed at their ends and seams or all over with flexo wax, with unsealed controls, and stored at 33–60° C. for two months. The following table shows the results:

*Dehydrated alfalfa in 200-gauge saran-film tubes: stored at 33–36° C.*

| Total Water, Per Cent | Wax-Seal at one end | Carotene Loss, Per Cent | Color |
|---|---|---|---|
| 4.2 | none | 67.0 | Green. |
| 7.5 | ends and seams | 2.3 | Do. |
| 7.5 | do | 3.4 | Do. |
| 7.5 | all over | 2.8 | Do. |
| 10.0 | ends and seams | 1.3 | Do. |
| 10.0 | do | 8.0 | Do. |
| 10.0 | all over | 1.3 | Do. |
| 12.5 | ends and seams | 3.7 | Olive Green. |
| 12.5 | all over | 3.9 | Do. |

(We believe the inconsistent 8% carotene loss shown for sample 6 was probably caused by a slight in-leakage of oxygen.)

The carotene losses were very low, and practically negligible whenever the ends and seams were sealed, and were substantially the same whether or not the sealing extended to the whole tube. This saran film is thus so nearly impervious to oxygen that it is effective container material for storage of carotene-containing plant material in the practice of our invention.

In practice we find it advantageous to use this saran film, or other oxygen-impervious plastic film, as an inner liner in an outer bag made of other material, which serves as a support and protector. That other material, for instance, may be burlap, cotton fabric, or paper, in the last case preferably of more than one thickness; such an outer bag effectively protects the plastic film (saran for instance) from scuffing and tearing. The plastic-film liners may be merely placed in the outer supporting bags, of course with fairly accurate fitting, with no fastening between liner and supporting bag; or the liners may be suitably fastened to the supporting bags, by adhesives for instance, or by the adhesion of the temporarily heat-softened liner to the outer bag.

We claim as our invention:

1. In the process of stabilizing carotene in carotene-containing plant material during storage, the improvement which consists in storing the carotene-containing plant material in a container substantially impervious to ingress of oxygen, with the moisture content in the carotene-containing plant material between 7% and 20%.

2. The process of stabilizing carotene in carotene-containing plant material during storage as set forth in claim 1, in which the moisture content is between 12% and 20%.

3. The process of stabilizing carotene in carotene-containing plant material during storage as set forth in claim 1, in which the moisture content is between 8% and 12%.

4. The process of stabilizing carotene in carotene-containing plant material during storage as set forth in claim 1, in which the carotene-containing plant material has been ground.

5. The process of stabilizing carotene in carotene-containing plant material during storage as set forth in claim 1, in which the carotene-containing plant material has been previously dried to a lower moisture content, and then ground, and then provided with additional water to produce a moisture content of between 12% and 20%.

6. The process of stabilizing carotene in carotene-containing plant material during storage as set forth in claim 1, in which the ingress of oxygen is prevented by coating the containers with wax.

7. The process of stabilizing carotene in carotene-containing plant material during storage as set forth in claim 1, in which the containers are of plastic film substantially impervious to oxygen.

8. The process of stabilizing carotene in carotene-containing plant material during storage as set forth in claim 1, in which the containers have inner liners of plastic film substantially impervious to oxygen.

9. The process of stabilizing carotene in carotene-containing plant material during storage as set forth in claim 1, in which the containers are of saran film.

10. The process of stabilizing carotene in carotene-containing plant material during storage as set forth in claim 1, in which the containers have inner liners of saran film.

11. The process of stabilizing carotene in carotene-containing plant material during storage as set forth in claim 1, in which the carotene-containing material is alfalfa.

12. The process of stabilizing carotene in carotene-containing plant material during storage as set forth in claim 1, in which the carotene-containing plant material is a cereal grass.

13. The process of stabilizing carotene in carotene-containing plant material during storage as set forth in claim 1, in which the carotene-containing plant material is oat grass.

14. The process of stabilizing carotene in carotene-containing plant material during storage as set forth in claim 1, in which the carotene-containing plant material is rye grass.

15. In the process of preserving during storage carotene in carotene-containing plant material which has been dried to a moisture content below 12%, the improvement which consists in adding moisture to that carotene-containing plant material to produce a moisture content of between 12% and 20%, and storing such carotene-containing plant material having that 12-to-20% moisture content in containers into which ingress of oxygen is substantially prevented.

16. The process of preserving carotene in carotene-containing plant material during storage as set forth in claim 15, in which the carotene-containing plant material has been ground.

17. The process of preserving carotene in carotene-containing plant material during storage as set forth in claim 15, in which the carotene-containing plant material is alfalfa.

18. The process of preserving carotene in carotene-containing plant material during storage as set forth in claim 15, in which the carotene-containing plant material is a cereal grass.

19. The process of preserving carotene in carotene-containing plant material during storage as set forth in claim 15, in which the carotene-containing plant material is oat grass.

20. The process of preserving carotene in carotene-containing plant material during storage as set forth in claim 15, in which the carotene-containing plant material is rye grass.

21. The process of stabilizing carotene in carotene-containing plant material during storage as set forth in claim 1, in which the storage temperature is of the order of 20° to 40° C.

22. The process of stabilizing carotene in carotene-containing plant material during storage as set forth in claim 1, in which the storage temperature does not exceed about 40° C.

23. The process of stabilizing carotene in carotene-containing plant material during storage as set forth in claim 1, in which the storage temperature does not exceed the temperature which inactivates the respiratory enzymes in the plant material.

EDWIN B. HART.
ANDREW W. HALVERSON.

REFERENCES CITED

The following references are of record in the file of this patent:

UNITED STATES PATENTS

| Number | Name | Date |
| --- | --- | --- |
| 917,124 | Peirson | Apr. 6, 1909 |
| 2,223,904 | Zentz et al. | Dec. 3, 1940 |
| 2,351,950 | Gernow | June 20, 1944 |
| 2,353,029 | Graham | July 4, 1944 |

Certificate of Correction

Patent No. 2,491,495                                                December 20, 1949

EDWIN B. HART ET AL.

It is hereby certified that errors appear in the printed specification of the above numbered patent requiring correction as follows:

Column 6, line 40, for "wer" read *were*; column 8, second table, first column thereof, for "12.0" read *12.5*; column 11, line 15, for "33–60° C." read *33–36° C.*;

and that the said Letters Patent should be read with these corrections therein that the same may conform to the record of the case in the Patent Office.

Signed and sealed this 11th day of April, A. D. 1950.

[SEAL]

THOMAS F. MURPHY,
*Assistant Commissioner of Patents.*